(12) United States Patent
Yanagisawa et al.

(10) Patent No.: US 11,975,677 B2
(45) Date of Patent: May 7, 2024

(54) AIRBAG DEVICE

(71) Applicant: TOYODA GOSEI CO., LTD., Kiyosu (JP)

(72) Inventors: Toshihito Yanagisawa, Kiyosu (JP); Wataru Miura, Kiyosu (JP); Yusuke Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 285 days.

(21) Appl. No.: 17/510,852

(22) Filed: Oct. 26, 2021

(65) Prior Publication Data

US 2022/0175060 A1 Jun. 9, 2022

(30) Foreign Application Priority Data

Dec. 7, 2020 (JP) ................................. 2020-202921

(51) Int. Cl.
 *B60R 21/272* (2006.01)
 *A41D 13/018* (2006.01)
 *B60R 21/0132* (2006.01)

(52) U.S. Cl.
 CPC ........ *B60R 21/272* (2013.01); *B60R 21/0132* (2013.01); *A41D 13/018* (2013.01)

(58) Field of Classification Search
 CPC . B60R 21/0132; B60R 21/268; B60R 21/272; B60R 21/26005; A41D 13/018

(Continued)

(56) References Cited

U.S. PATENT DOCUMENTS 5,472,231 A * 12/1995 France .................... B60R 21/33
 280/733
5,591,900 A * 1/1997 Bronowocki ......... G01M 99/00
 280/736

(Continued)

FOREIGN PATENT DOCUMENTS

CN 103419740 A * 12/2013
CN 110946352 * 7/2021

(Continued)

OTHER PUBLICATIONS

Office Action dated Sep. 26, 2023 issued in corresponding Japanese Patent Application No. 2020-202921 (and English machine translation).

(Continued)

*Primary Examiner* — Timothy L Maust
(74) *Attorney, Agent, or Firm* — POSZ LAW GROUP, PLC

(57) ABSTRACT

The airbag device includes an airbag and a gas generator. The gas generator includes a body containing inflation gas and sealed with an unsealable lid, and a discharge portion that includes a housing, an outlet that is formed in the housing and allows outflow of gas to the airbag when the body is unsealed, a piercing pin for unsealing the lid, a spring for moving the pin, a retaining member that retains the spring, and a sliding mechanism that shifts the retaining member to a release position. The sliding mechanism includes a drive source and a connecting member that shifts the retaining member to the release position by a driving force of the drive source. The piercing pin, spring, lid and a portion of the retaining member retaining the spring are housed in the housing. The drive source and connecting member are partitioned from a gas channel inside the housing.

5 Claims, 14 Drawing Sheets

(58) Field of Classification Search
USPC .......................................................... 141/330
See application file for complete search history.

(56) References Cited

U.S. PATENT DOCUMENTS

| | | | | |
|---|---|---|---|---|
| 5,746,442 | A * | 5/1998 | Hoyaukin | B62J 27/20 2/456 |
| 5,820,162 | A * | 10/1998 | Fink | B60R 21/26 137/71 |
| 6,789,820 | B2 * | 9/2004 | Meduvsky | B60R 21/268 280/736 |
| 7,011,232 | B2 * | 3/2006 | Colombo | B60R 21/274 222/5 |
| 9,629,399 | B2 * | 4/2017 | Raanan | A41D 13/0506 |
| 11,155,325 | B2 * | 10/2021 | Garner | B63C 9/1255 |
| 11,730,984 | B2 * | 8/2023 | Huseth | F16B 45/023 24/573.11 |
| 2010/0255809 | A1 * | 10/2010 | Aschauer | A63B 29/021 455/404.2 |
| 2019/0150532 | A1 | 5/2019 | Weinstein et al. | |

FOREIGN PATENT DOCUMENTS

| | | | | |
|---|---|---|---|---|
| FR | 2850446 | A1 * | 7/2004 | ....... B60R 21/26005 |
| JP | S58-106299 | A | 6/1983 | |
| JP | 3214415 | U | 1/2018 | |
| KR | 100894722 | B1 * | 4/2009 | |
| KR | 10-2020-0044443 | A | 4/2020 | |

OTHER PUBLICATIONS

Office Action dated Jan. 23, 2024 in corresponding Japanese Patent Application No. 2020-202921 (and English machine translation).

* cited by examiner

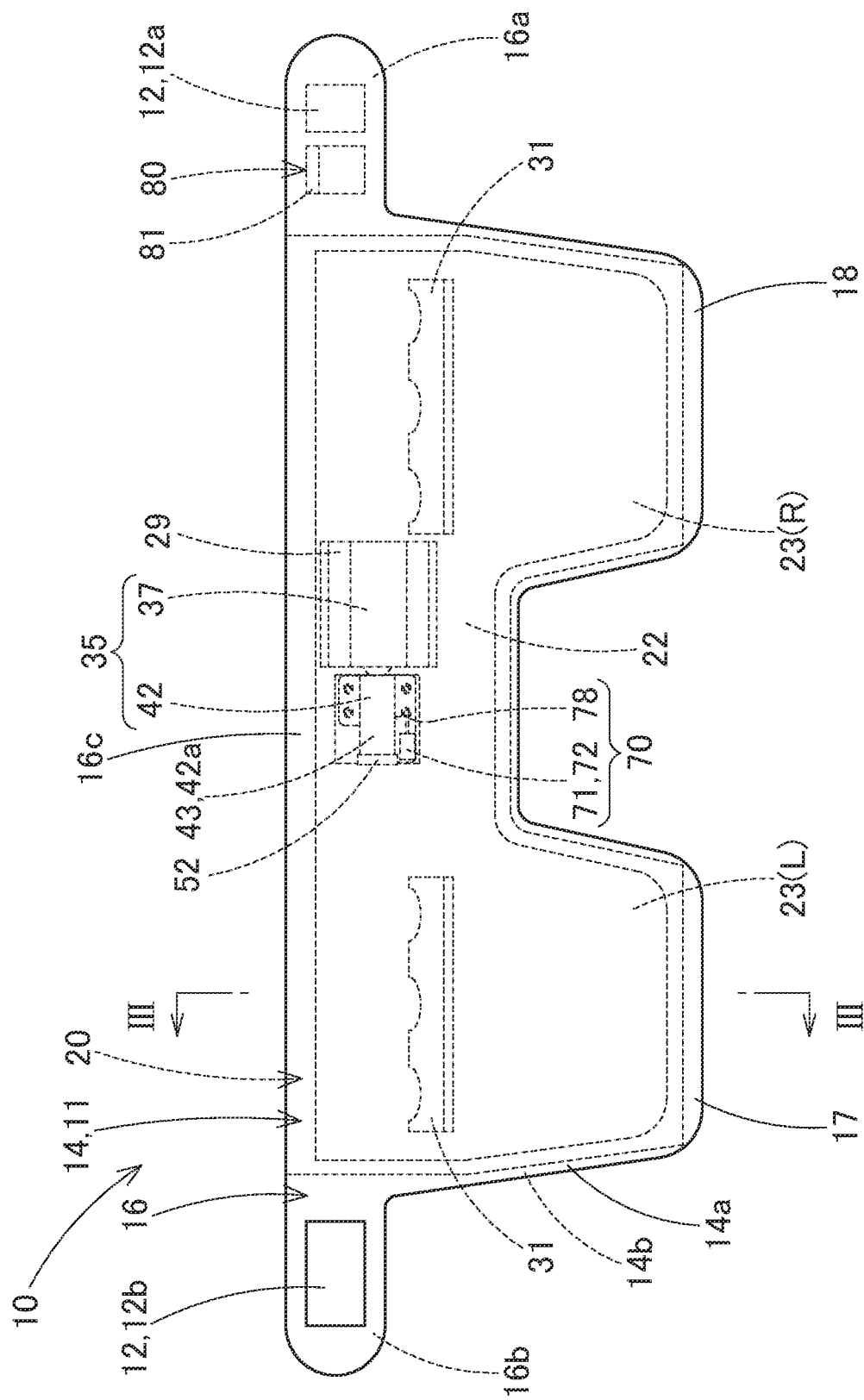

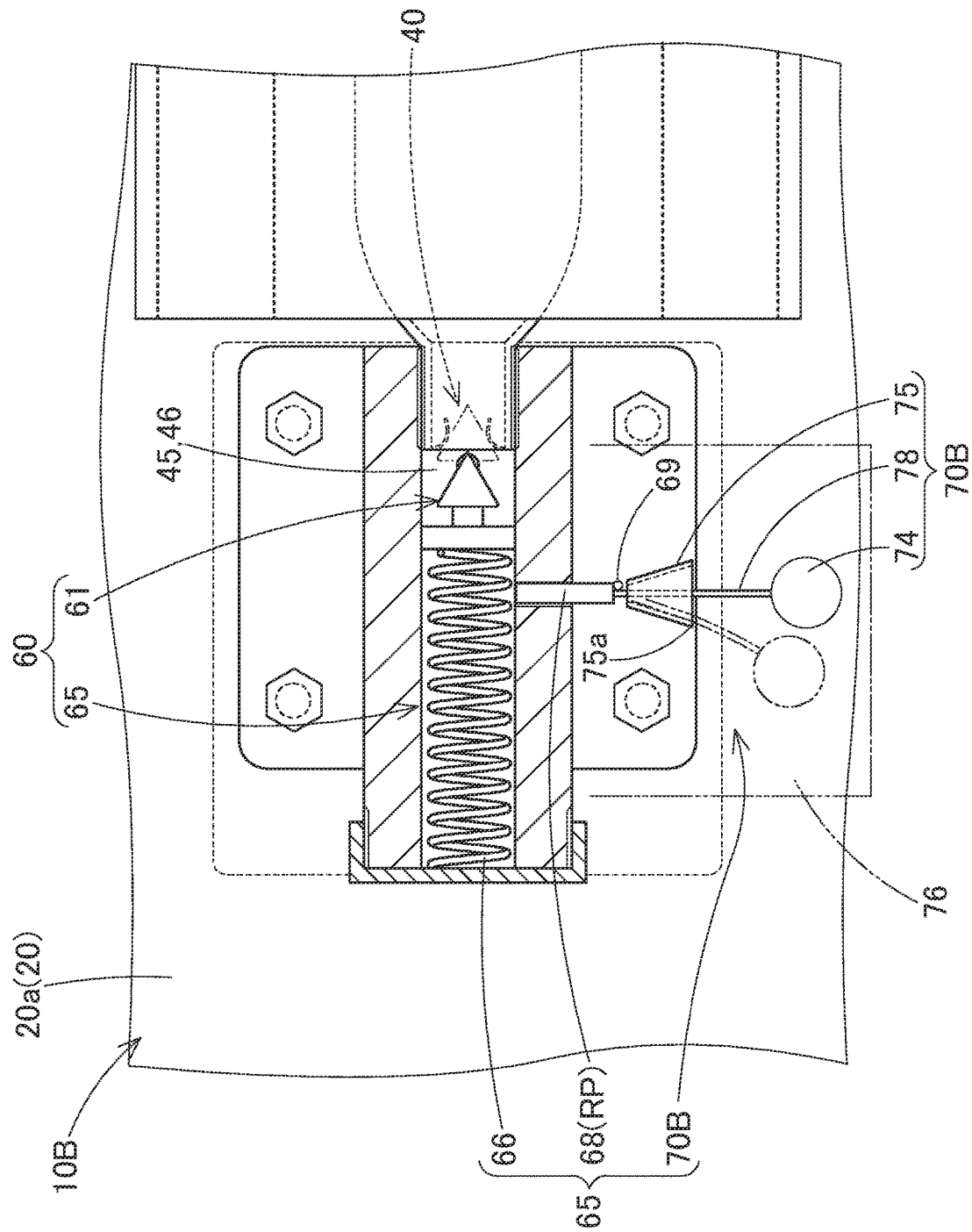

AIRBAG DEVICE

CROSS REFERENCE TO RELATED APPLICATIONS

The present application claims priority from Japanese Patent Application No. 2020-202921 of Yanagisawa et al., filed on Dec. 7, 2020, the entire disclosure of which is incorporated herein by reference.

BACKGROUND

1. Technical Field

The present disclosure relates to an airbag device that includes an airbag which is inflatable with an inflation gas and a gas generator which feeds the airbag with an inflation gas. More particularly, the disclosure relates to an airbag device that makes use of a piercing pin in order to unseal and operate the gas generator.

2. Description of Related Art

U.S. Pat. No. 5,746,442A discloses an airbag device that includes an airbag inflatable with an inflation gas, and a gas generator which contains the inflation gas. The gas generator includes a main body that contains the inflation gas and closed with a unsealable closure, and a gas discharge portion that includes an outlet port which allows the inflation gas in the main body to flow into the airbag there through when the closure of the main body is unsealed. The gas discharge portion further includes means for unsealing the closure of the main body. The means for unsealing includes a piercing pin that is configured to pierce and unseal the closure, and means for moving the piercing pin so the pin pierces the closure. The means for moving makes use of a pressure generated upon detonation of a charge. Subjected to the pressure, the piercing pin moves toward the closure, pierces and unseals the closure, so as to allow the inflation gas such as a compressed gas and an inert gas contained in the main body of the gas generator to flow into the airbag through the outlet port of the gas discharge portion, thus inflating the airbag.

That is, in the airbag device disclosed in the literature described above, the means for moving the piercing pin so the pin pierces the closure is configured to make use of the pressure generated by burning the charge in a vicinity of the piercing pin. This configuration may cause a flame generated by burning the charge to enter into the airbag together with the inflation gas and damage the airbag.

Therefore, it would be desirable to provide an airbag device that has no fear of damage of the airbag by heat, though whose gas generator to feed the airbag with an inflation gas is configured to discharge the inflation gas with the use of a piercing pin.

SUMMARY

An exemplary embodiment in the present disclosure relates to an airbag device including:
- an airbag that is configured to be inflated with an inflation gas, the airbag including a gas-inlet portion;
- a gas generator that includes a main body which contains the inflation gas and sealed with an unsealable lid, and a gas discharge portion that includes a housing provided with an outlet port which is in gas communication with the gas-inlet portion of the airbag and configured to allow outflow of the inflation gas to the gas-inlet portion of the airbag when the lid is unsealed; and
- a means for unsealing the lid of the main body of the gas generator, the means for unsealing being disposed in the gas discharge portion of the gas generator, the means for unsealing including a piercing pin that is configured to pierce and unseal the lid, and a means for moving the piercing pin to a position to pierce the lid,
- wherein the means for moving includes:
  - a spring that is configured to push and move the piercing pin from a wait position to the position to pierce;
  - a retaining member that retains a leading end of the spring so the spring holds the piercing pin at the wait position; and
  - a sliding mechanism that is configured to move the retaining member from a retaining position at which the retaining member retains the leading end of the spring to a release position at which the retaining member releases the leading end of the spring;
- wherein the sliding mechanism includes:
  - a drive source that is configured to exert a driving force; and
  - a connecting member that is connected to the retaining member and the drive source and configured to move the retaining member to the release position by the driving force exerted by the drive source;
- wherein the piercing pin, the spring, the lid of the main body of the gas generator and a portion of the retaining member that retains the leading end of the spring are housed in the housing of the gas discharge portion of the gas generator so that a gas channel from the lid to the outlet port is formed inside the housing; and
- wherein the drive source and the connecting member of the sliding mechanism are located in a region partitioned from the gas channel by the housing, in the gas discharge portion.

BRIEF DESCRIPTION OF DRAWINGS

FIG. 2 is a back view of the airbag device in accordance with the first embodiment as laid flat.

FIG. 14 is a schematic sectional view illustrating the airbag device in accordance with the third embodiment at operation.

DETAILED DESCRIPTION

Figure 1B:
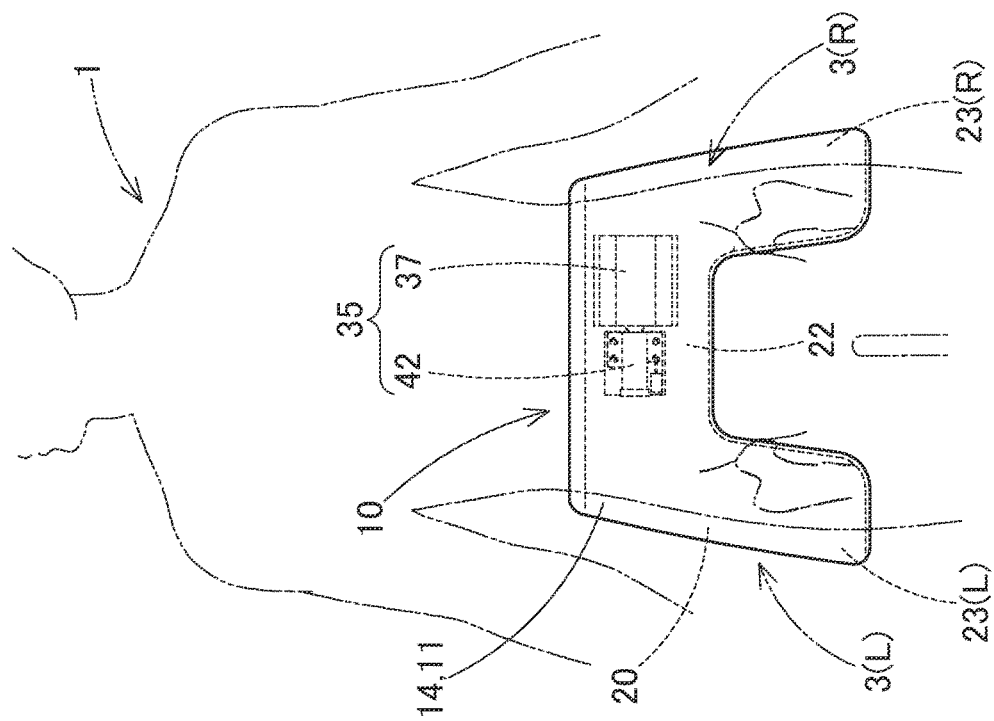
FIG. 1B is a schematic back view of the airbag device in accordance with the first embodiment as worn by the wearer.
Figure 1A:
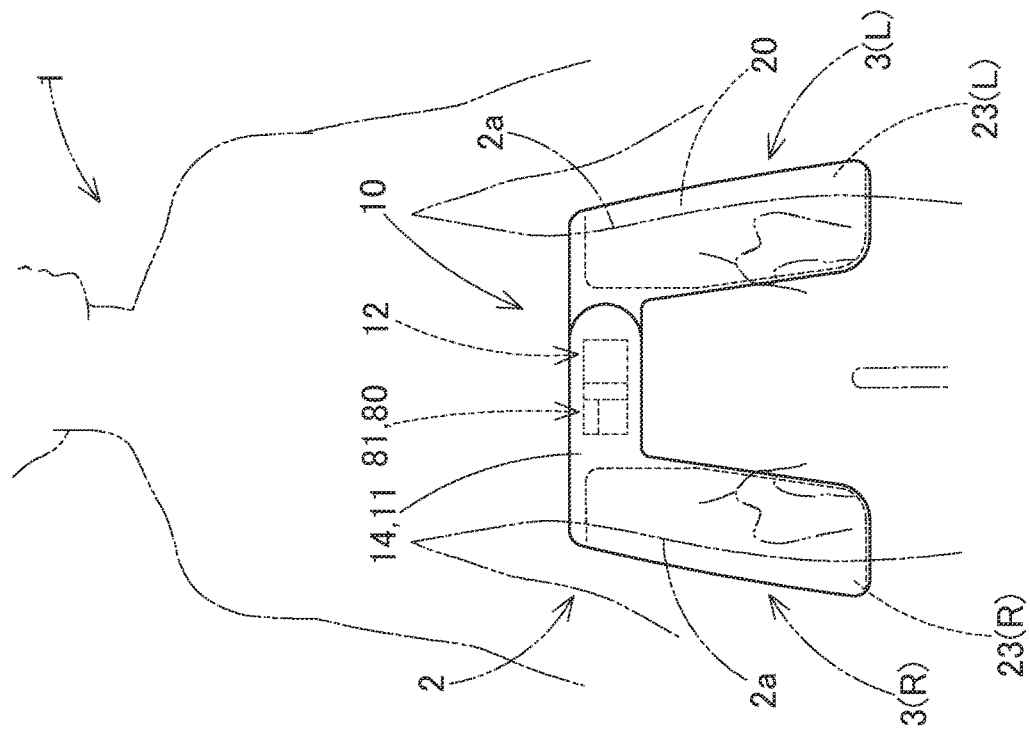
FIG. 1A is a schematic front view of an airbag device in accordance with the first embodiment as worn by a wearer.
Figure 3:
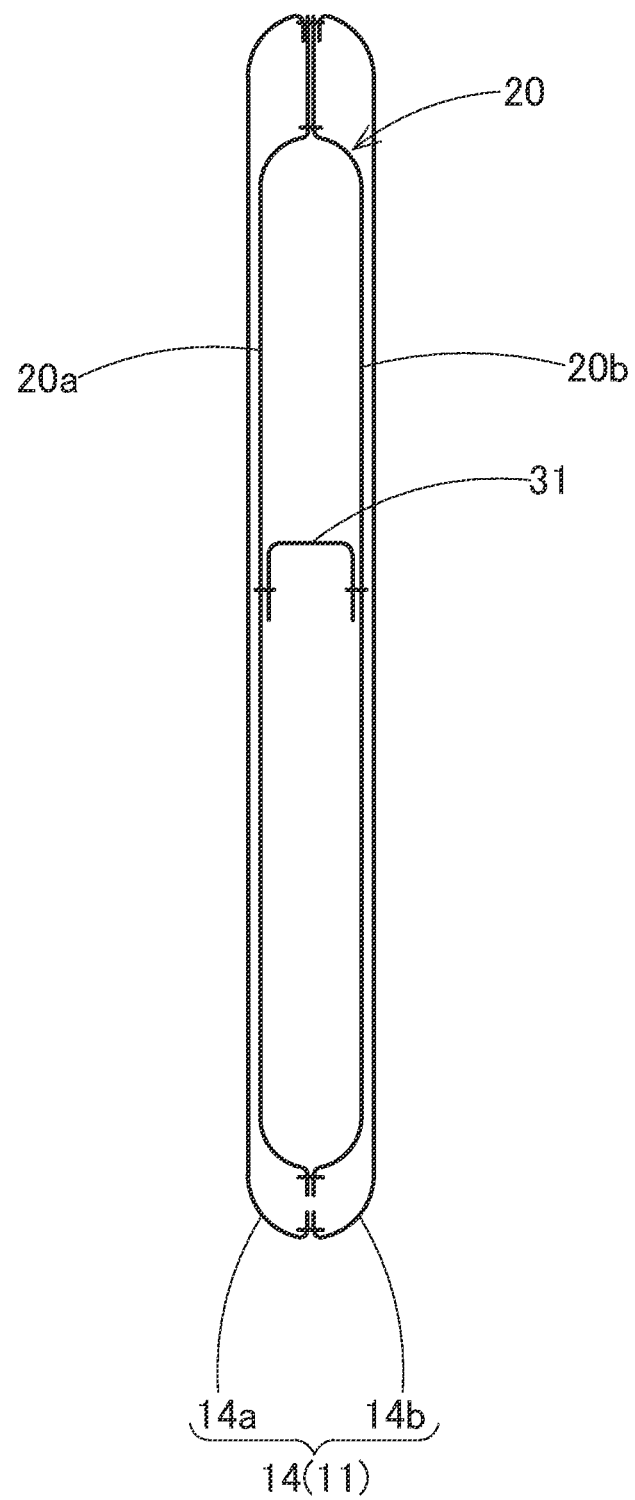
FIG. 3 is a schematic vertical sectional view taken along line III-III of FIG. 2.
Figure 4:
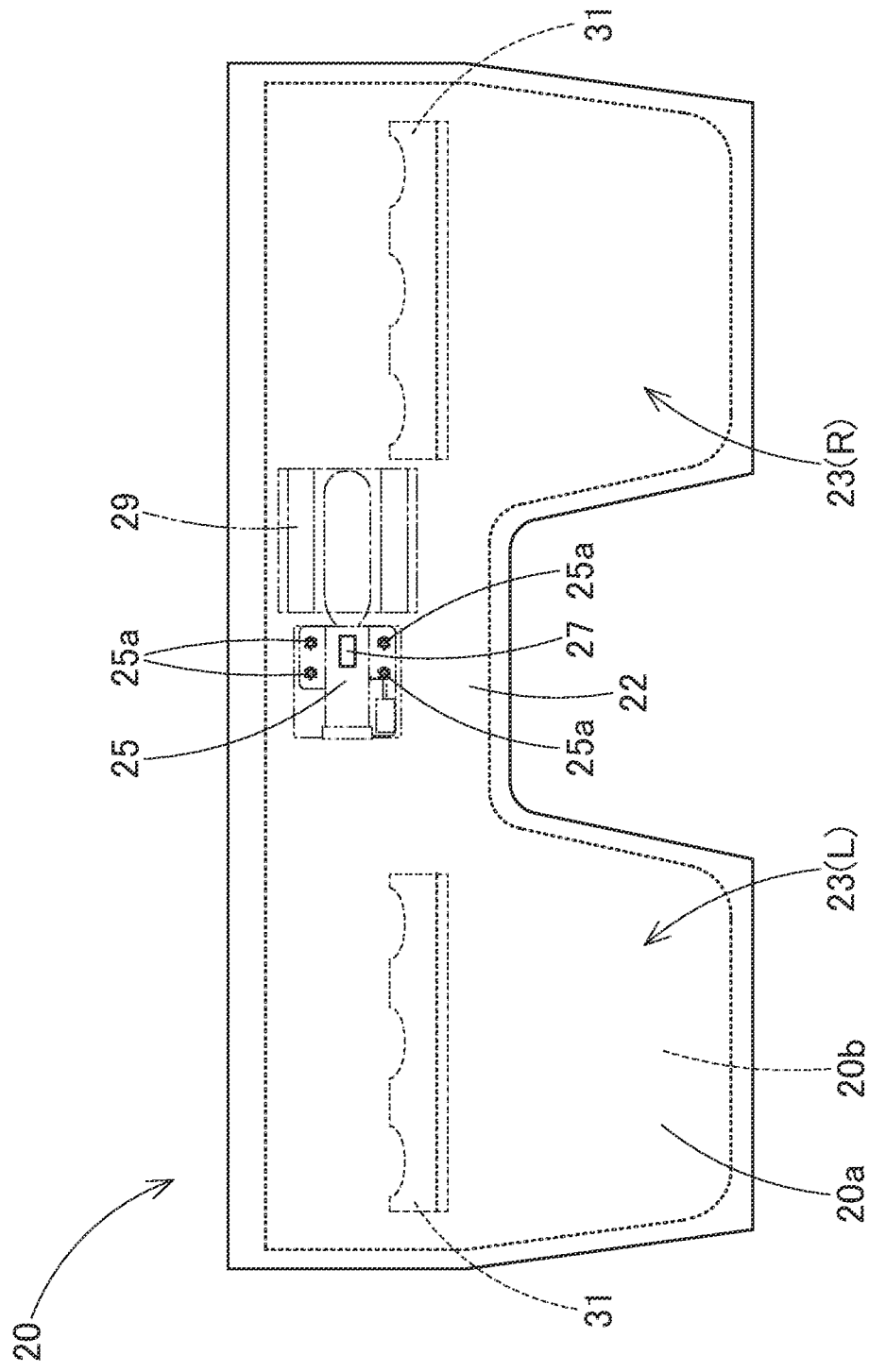
FIG. 4 is a front view of an airbag for use in the airbag device in accordance with the first embodiment, in a flattened state.

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

The airbag device in accordance with the first embodiment is a wearable airbag device 10 that a wearer (for example, an elderly person) 1 can put on. Referring to FIGS. 1A to 6, the wearable airbag device 10 includes an airbag 20, a gas generator 35, an operation control device 80 that includes a sensor 81 for detecting a fall of the wearer 1 and is configured to actuate the gas generator 35, and a holding body 11 that is formed into a belt and holds the airbag 20, the gas generator 35 and the operation control device 80.

As can be seen in FIGS. 1A to 3, the holding body 11 is formed into a belt that is wearable around the hip 2. The holding body 11 includes, in the left and right ends, a fastener 12 composed of hooks 12a and loops 12b. The holding body 11 serves as an outer cover 14 that covers the airbag 20. The holding body 11 is comprised of a front panel 14a and a back panel 14b that are sewn together by the outer circumferential edges. The front panel 14a and back panel 14b are each formed of woven fabric of polyester or the like having flexibility.

The outer cover 14 as the holding body 11 as developed flat includes a band-shaped portion 16 that extends in a left and right direction in the upper portion, and two great-width portions 17, 18 that extend downward from left and right portions of a central portion 16c in the left and right direction of the band-shaped portion 16. The hooks 12a and loops 12b of the fastener 12 are disposed in left and right ends 16a, 16b of the band-shaped portion 16, respectively.

As can be seen in FIGS. 1A to 4, the airbag 20 includes two protecting inflatable portions 23 (23L, 23R) each of which is formed into a substantially rectangular plate, and a communicating portion 22 that connects upper portions of the protecting inflatable portions 23L, 23R. The airbag 20 is also comprised of a front panel 20a and a back panel 20b that are sewn together by the outer circumferential edges. Each of the front panel 20a and back panel 20b is also formed of woven fabric of polyester or the like having flexibility. Each of the protecting inflatable portions 23L, 23R is configured to cover a left/right side 2a of the hip 2 of the wearer 1, i.e. a vicinity of the left/right trochanter 3 (3L/3R) of femur as a targeted body part, when inflated. Each of the protecting inflatable portions 23L, 23R is internally provided with a tether 31 that is configured to limit a distance between the front panel 20a and back panel 20b at airbag deployment so the protecting inflatable portion 23L/23R is inflated into a board shape with a predetermined thickness.

The trochanters 3 (3L, 3R) of femurs are body parts that are prone to injury or fracture at fall, and would require a long time to treat if injured. The protecting inflatable portions 23L, 23R are provided to protect those body parts.

The airbag 20 is sewn to an upper edge portion of the outer cover 14 by the upper edge portion so that the left and right protecting inflatable portions 23L, 23R are stored inside the great-width portions 17, 18, respectively, and the communicating portion 22 is stored inside the central portion 16c of the band-shaped portion 16. Thus the airbag 20 is held by the holding body 11. As can be seen in FIGS. 4 and 6 to 8, the airbag 20 includes, in the front panel 20a in the communicating portion 22, an inlet port 27 for introducing an inflation gas G. A vicinity of the inlet port 27 serves as a gas-inlet portion 25 of the inflation gas G, and also serves as a mounting portion of a later-described gas discharge portion 42 of the gas generator 35. The mounting portion is provided with four mounting holes 25a. A cover cloth 29 for covering the outer surface of a later-described main body 37 of the gas generator 35 is sewn to the front panel 20a.

As can be seen in FIGS. 2 and 4 to 10, the gas generator 35 includes a main body 37 that contains an inflation gas G composed from carbon dioxide or the like in a compressed state. The gas generator 35 further includes a gas discharge portion 42 that is provided with an outlet port 47 from which the inflation gas G in the main body 37 is discharged into the gas-inlet portion 25 of the airbag 20.

The main body 37 includes a metal bomb containing the inflation gas G, and a lid 38 that is disposed at the leading end of the bomb and has a smaller diameter than the bomb. The lid 38 is unsealably sealed with a sealing plate 39 at the leading end, thus unsealably sealing the main body 37. The sealing plate 39 has such a thickness as to allow an opening 40 (FIGS. 9 and 10) to be formed when pierced by the leading end 61a of a later-described piercing pin 61. The lid 38 is provided with male threads 38a on the outer circumference.

The gas discharge portion 42 is disposed in a vicinity of the gas-inlet portion 25 of the airbag 20. The gas discharge portion 42 includes a front-side portion 42a that is disposed on the front side of the front panel 20a of the airbag 20, and a back-side portion 42b that is disposed on the back side of the front panel 20a. The front-side portion 42a and back-side portion 42b sandwich the gas inlet portion 25 of the airbag 20 and are mounted on the airbag 20 with bolts 58 put through the mounting holes 25a formed in the gas-inlet portion 25, and nuts 59.

A means 60 for unsealing the lid 38 (namely, unsealing means 60) is disposed in the front-side portion 42a of the gas discharge portion 42. The unsealing means 60 includes a piercing pin 61 that is configured to pierce the sealing plate 39 of the lid 38 to unseal the lid 38, and a means 65 for moving the piercing pin 61 (namely, moving means 65) to make the piercing pin 61 to pierce the lid 38.

The moving means 65 includes a spring 66 that is configured to push and move the piercing pin 61 from a wait position to a position to pierce the lid 38 (namely, a piercing position), a retaining member 68 that retains the leading end 66a of the spring 66 to hold the piercing pin 61 at the wait position, and a sliding mechanism 70 that is configured to move the retaining member 68 from a retaining position FP (FIG. 5) at which the retaining member 68 retains the leading end 66a of the spring 66 to a release position RP at which the retaining member 68 releases the leading end 66a of the spring 66, as described later.

The sliding mechanism 70 includes a driver source 71 that is configured to exert a driving force, and a connecting member 78 that is connected to the retaining member 68 and drive source 71 and configured to pull the retaining member 68 to the release position RP.

Figure 5:
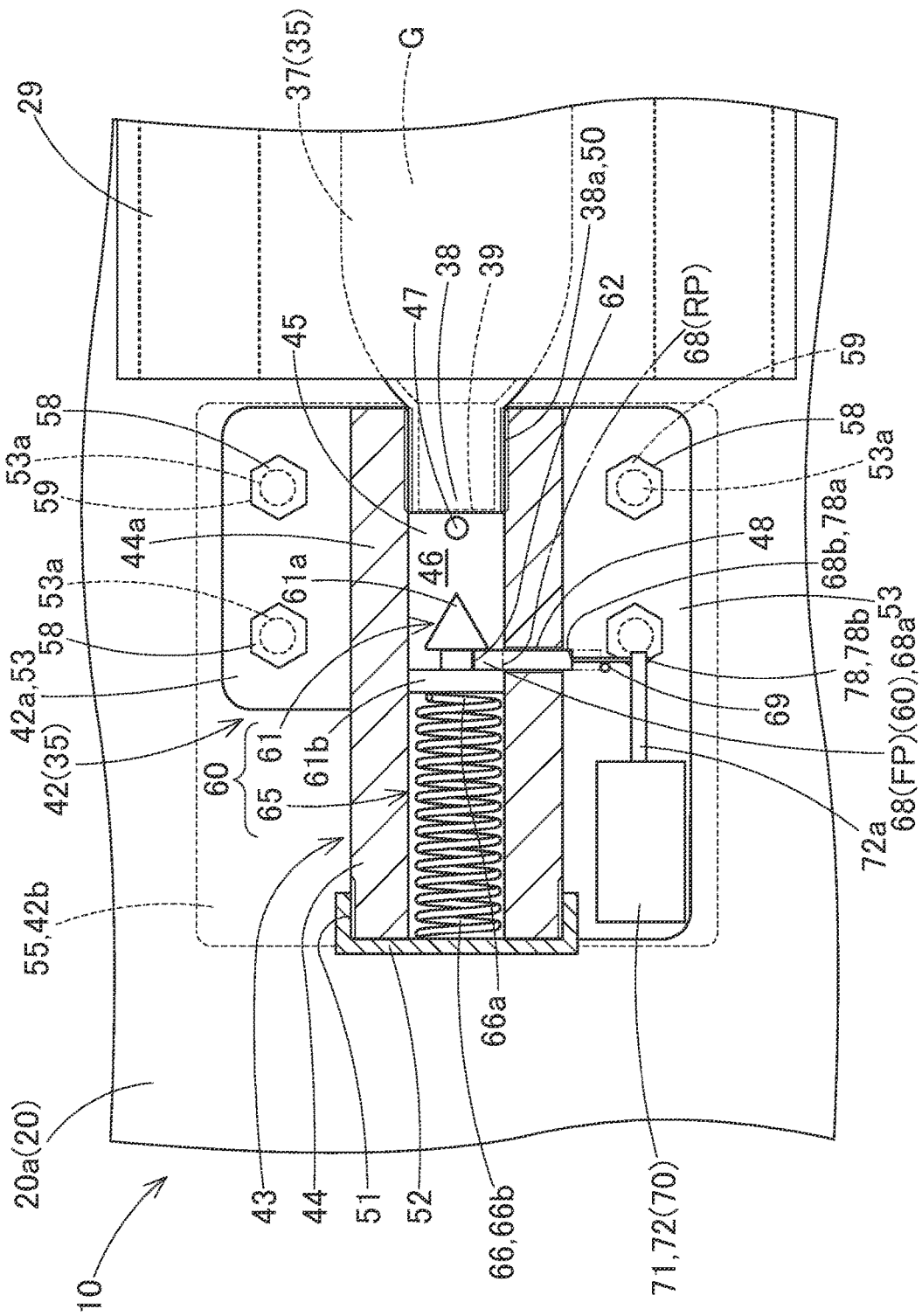
FIG. 5 is a schematic sectional view taken along line V-V of FIG. 7.
Figure 7:
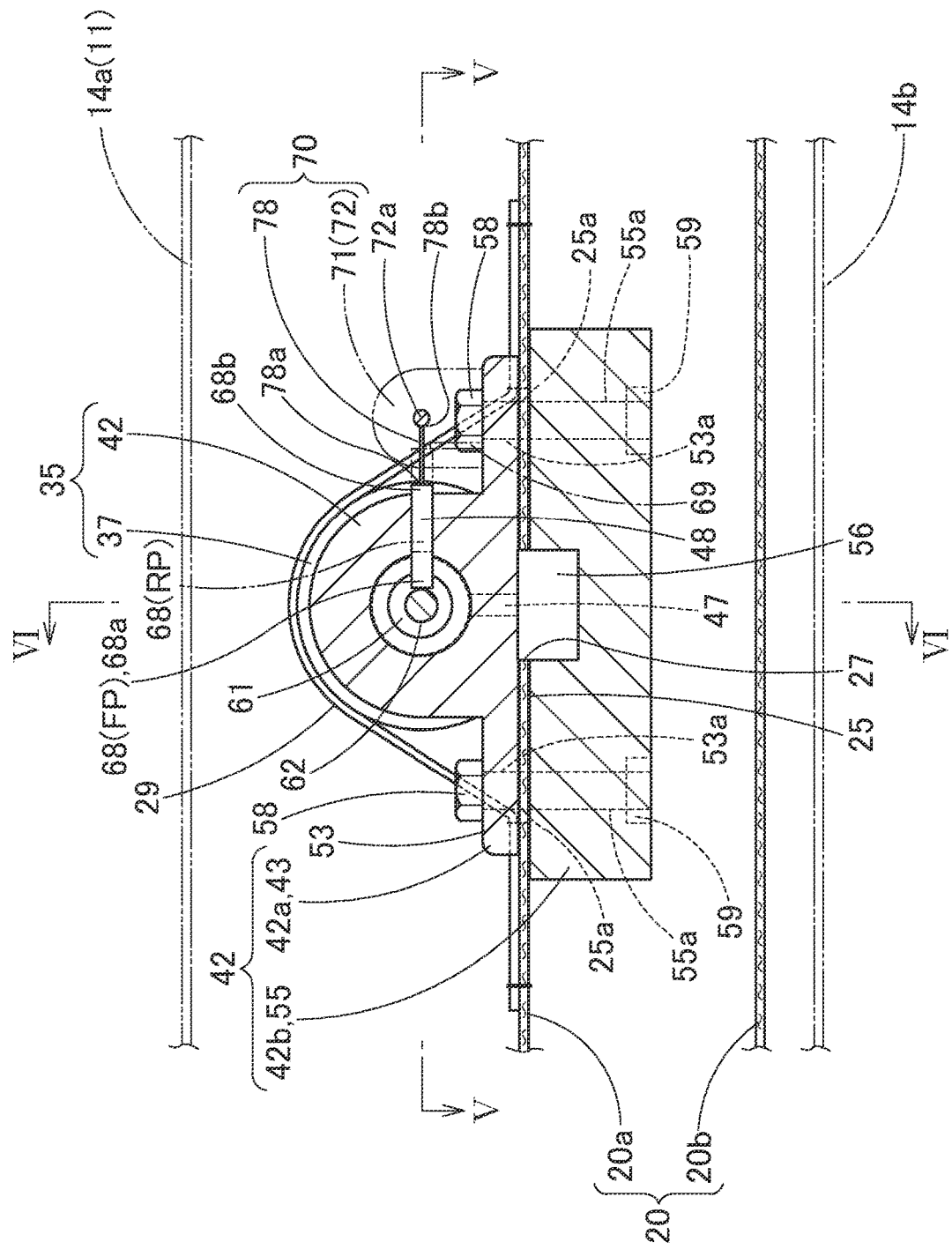
FIG. 7 is a schematic sectional view taken along line VII-VII of FIG. 6.
Figure 9:
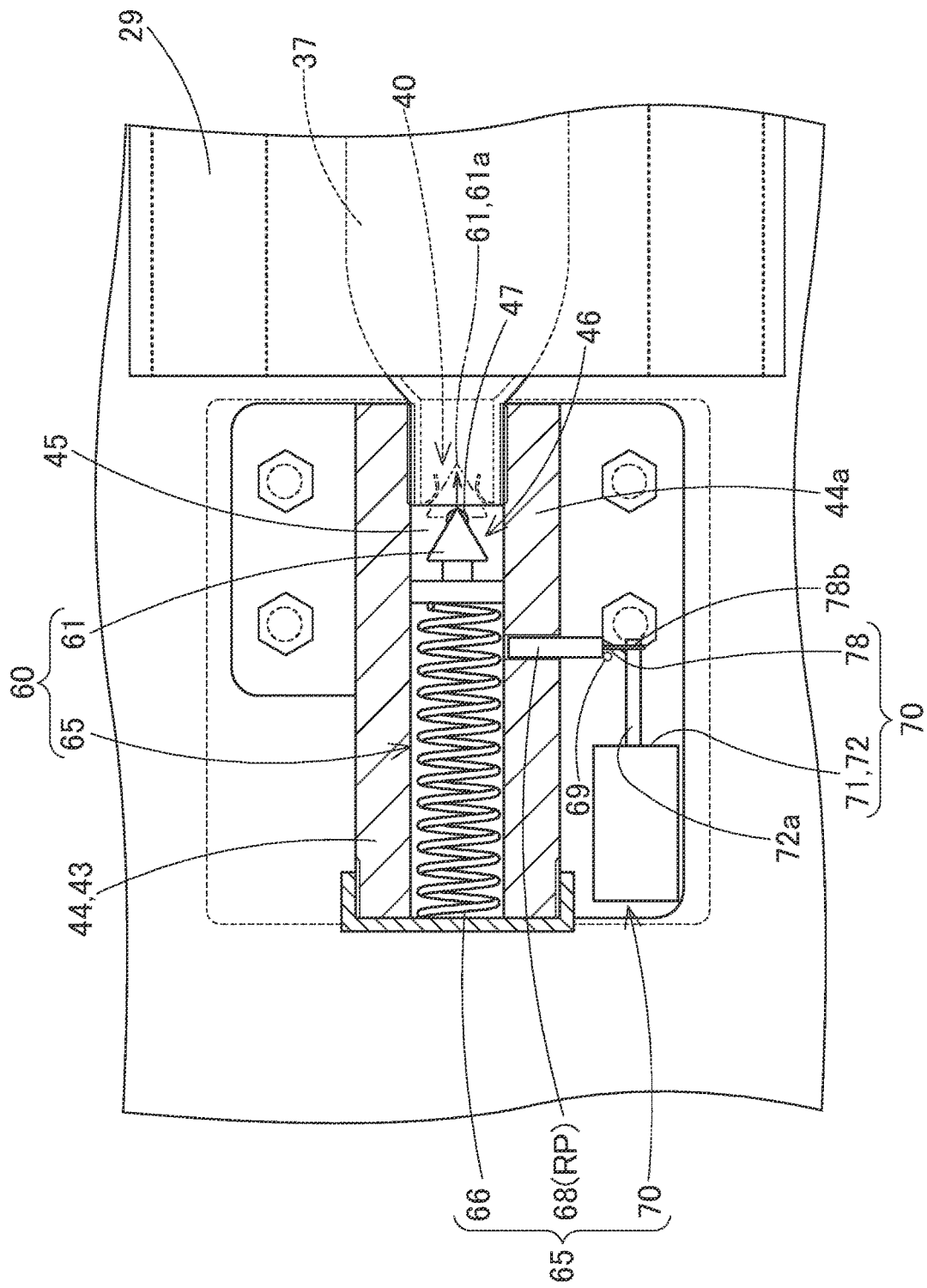
FIG. 9 is a schematic sectional view of the airbag device in accordance with the first embodiment as actuated, taken at the same position as in FIG. 5.

In the first embodiment, the piercing pin 61 has a conical shape with a pointed leading end 61a, and includes an annular retaining groove 62 on an outer circumference of the base portion 61b. The retaining member 68 is formed from metal and has a band shape. The retaining member 68 has the retaining position FP and release position RP. The retaining position FP is the position at which the leading end 68a portion of the retaining member 68 is inserted into the retaining groove 62 and retains the leading end 66a of the spring 66 as shown in FIGS. 5 and 7, and the release position RP is the position at which the leading end 68a portion of the retaining member 68 is out of the retaining groove 62, as shown in FIGS. 7 and 9. The connecting member 78 is composed of a wire and connected to a base portion 68b of the retaining member 68 at the leading end 78a. The base portion 78b of the connecting member 78 is wound around a driving shaft 72a of an actuator (as the drive source 71) 72 composed of a motor.

In the gas discharge portion 42 of the first embodiment, the front-side portion 42a is formed from such metal as steel and aluminum, and the back-side portion 42b is composed of a holding plate 55 formed from such metal as steel and aluminum.

The gas discharge portion 42 includes, in the front-side portion 42a, a housing 43 composed of a tubular portion 44 that covers the piercing pin 61 and spring 66, and a mounting plate 53 that is located in a part of the front-side portion 42a facing toward the airbag 25 and has a flat plate shape pressed against the gas-inlet portion 25 of the airbag 25. The housing 43 or tubular portion 44 includes a though hole 45 going through in the left and right direction.

The tubular portion 44 (i.e. housing 43) is provided, in the inner circumference at the right end portion of the through hole 45, with female threads 50 engageable with the male threads 38a of the lid 38 of the main body 37 of the gas generator 35. The main body 37 of the gas generator 35 is assembled with the tubular portion 44 with the male threads 38a engaged with the female threads 50 of the tubular portion 44. The tubular portion 44 further includes male threads 51 in the outer circumference of the left end portion, thereby a cap 52 is attached to the left end portion of the tubular portion 44. The cap 52 serves as a spring seat and supports the base portion 66b of the spring 66 composed of a compression coil spring inside the through hole 45. The leading end 66a of the spring 66 is connected to the base portion 61b of the piercing pin 61. The piercing pin 61 and the spring 66 are configured to be able to move to a vicinity of the lid 38 of the main body 37 of the gas generator 35 inside the through hole 45. The tubular portion 44 further includes, in a vicinity of the leading end 66a of the spring 66 in the wait position, an assembling hole 48 which goes through in a direction perpendicular to the through hole 45. The retaining member 68 is inserted through the assembling hole 48 in a slidable fashion against the inner circumference of the assembling hole 48. When the retaining member 68 is located at the retaining position FP at which the leading end 68a is inserted into the retaining groove 62 of the piercing pin 61, the retaining member 68 keeps the spring 66 compressed and holds the piercing pin 61 at the wait position. When the retaining member 68 is pulled out of the retaining groove 62 and shifts to the release position RP, the spring 66 moves the piercing pin 61 to the position to pierce the lid 38 by its restoring force. The retaining member 68 as shifted to the release position RP is configured to abut against a stopper 69 (FIGS. 5 and 7) disposed on the mounting plate 53 at the base portion 68b and be prevented from coming off of the assembling hole 48.

Figure 10:
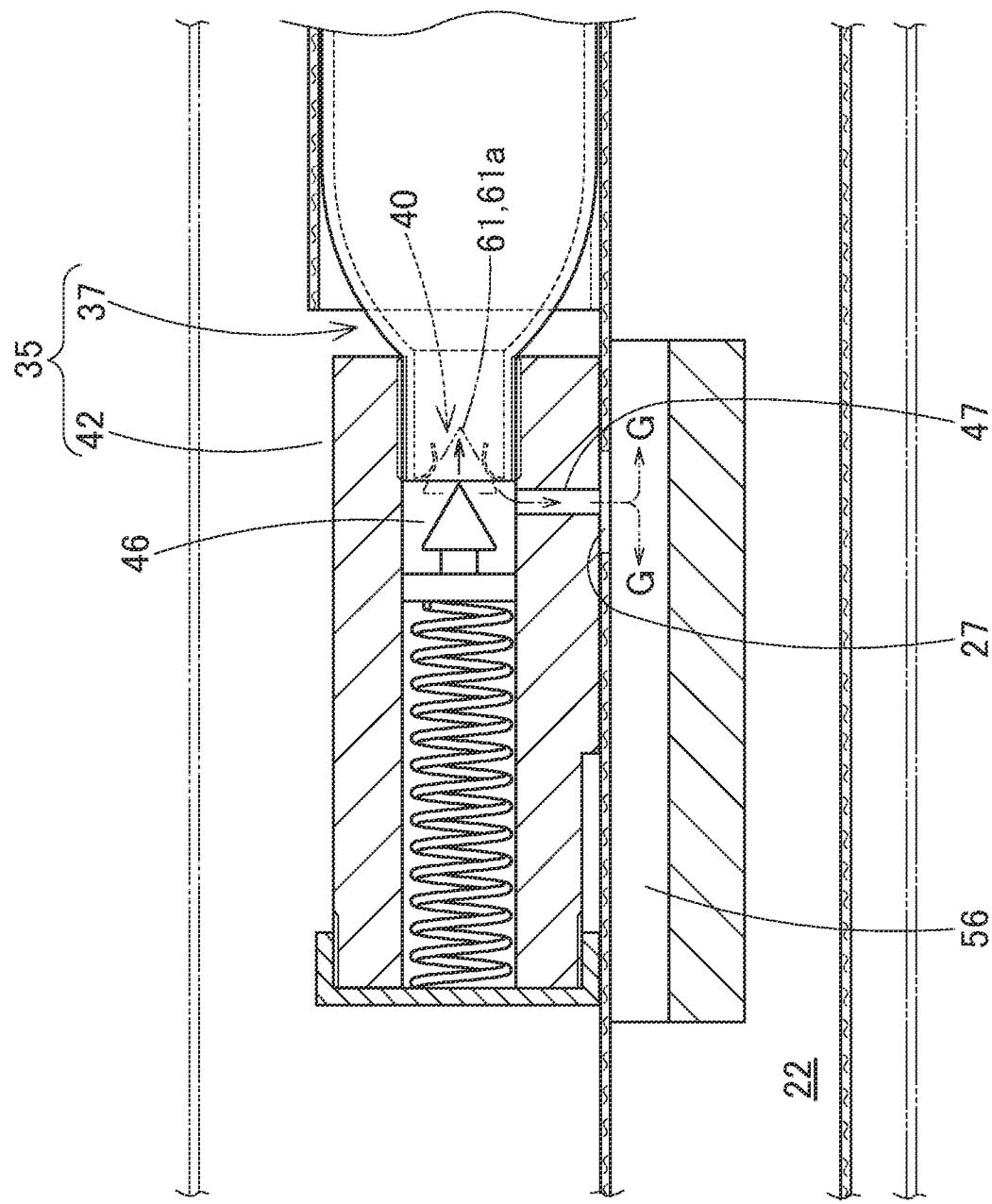
FIG. 10 is a schematic sectional view of the airbag device in accordance with the first embodiment as actuated, taken at the same position as in FIG. 6.

The tubular portion 44 (i.e. the housing 43) further includes, at a position slightly to the left of the sealing plate 39 of the lid 38 of the main body 37 as coupled with the tubular portion 44, an outlet port 47 that goes through in a direction perpendicular to the through hole 45 and is in gas communication with the inlet port 27 of the airbag 20. When the piercing pin 61 is subjected to the restoring force of the spring 66, moves toward the lid 38 and the leading end 61a of the piercing pin 61 pierces the sealing plate 39 of the lid 38 and forms an opening 40 in the sealing plate 39 as shown in FIGS. 9 and 10, an inflation gas G contained in the main body 37 flows out of the opening 40 into the through holes 45, then further flows into the airbag 20 via the outlet port 47 and inlet port 27 of the airbag 20. Since the through hole 45 is configured airtight, the inflation gas G discharged into the though hole 45 from the opening 40 flows into the airbag 20 via a gas channel 46 in the through hole 45, outlet port 47 and inlet port 27 without leaking.

The motor 27 as the drive force 71 is mounted on the mounting plate 53 of the gas discharge portion 42, and the connecting member 78 is connected at the leading end 78a to the base portion 68b of the retaining member 68 protruding from the tubular portion 44 (i.e. housing 43) and has the base portion 78b wound around the drive shaft 72a of the motor 72. That is, in the gas discharge portion 42 of the illustrated embodiment, the motor (drive source 71) 72 and the connecting member 78 are disposed in a region partitioned from the gas channel 46 extending from the lid 38 to the outlet port 47 in the housing 43 by a circumferential wall 44a of the tubular portion 44.

As described above, the gas discharge portion 42 has the mounting plate 53 disposed on the outer surface of the front panel 20a of the airbag 20 and has the holding plate 55 disposed on the back side of the front panel 20a. The gas discharge portion 42 is mounted on the gas-inlet portion 25 (i.e. on the periphery of the inlet port 27) disposed in the front panel 20a of the airbag 20 with the bolts 58 passed through the mounting holes 53a formed in the mounting plate 53, mounting holes 25a formed in the gas-inlet portion 25 and mounting holes 55a of the holding plate 55 and fastened with nuts 59 embedded in the mounting holes 55a.

Figure 6:
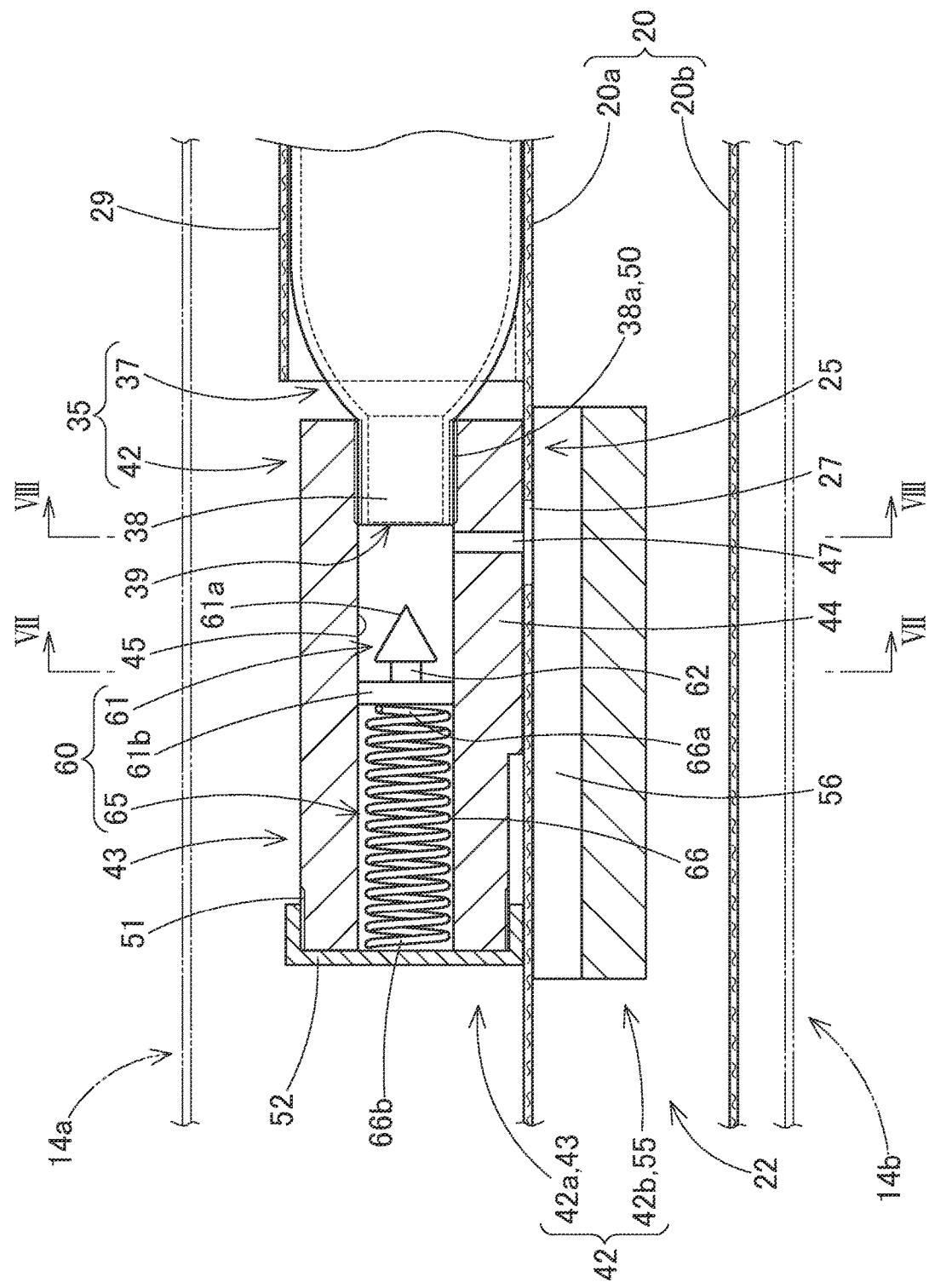
FIG. 6 is a schematic sectional view taken along line VI-VI of FIG. 7.
Figure 8:
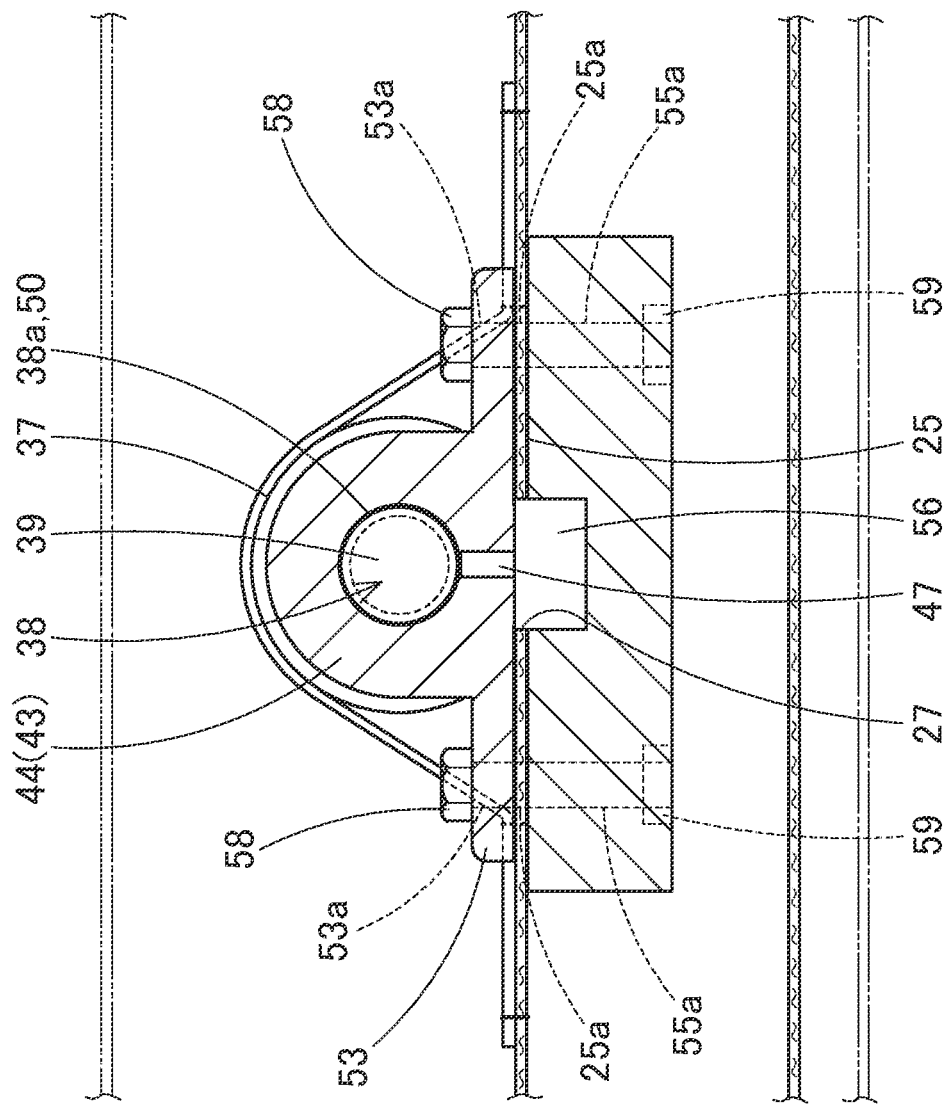
FIG. 8 is a schematic sectional view taken along line VIII-VIII of FIG. 6.

The holding plate 55 includes a gas channel 56 that is composed of a groove extending in the left and right direction and configured to deliver the inflation gas G flowing in via the inlet port 27 to both of the left and right protecting inflatable portions 23L, 23R, as can be seen in FIGS. 6 to 8.

The operation control device 80 is mounted on the outer cover 14. The operation control device 80 includes a sensor 81 that includes an angular velocity sensor capable of sensing angular velocities around three axes in up and down, front and rear, and left and right directions, and an acceleration sensor capable of sensing accelerations in the three-axis directions. The operation control device 80 is configured to actuate the motor (i.e. the actuator) 72 in response to a signal fed from the sensor 81 which has sensed a falling behavior different from a normal behavior of the wearer 1. More particularly, the operation control device 80 includes a determining means that is configured to determine based on various thresholds, and is configured to actuate the motor 72 upon sensing a fall of the wearer 1 based on the determination by the determining means. The operation control device 80 further includes a power source composed of a not-shown battery or the like for operation of the sensor 81 and motor 72.

If the wearer 1 wearing the holding body 11 on the hip 2 falls, the operation control device 80 actuates, in response to a signal from the sensor 81, the motor 72 as the drive source 71 of the sliding mechanism 70 disposed in the gas discharge portion 42 of the gas generator 35. Then a rotary driving force of the shaft 72*a* of the motor 72 acts on the base portion 78*b* of the connecting member 78 to rewind the base portion 78*b*, so that the connecting member 78 shifts the retaining member 68 from the retaining position FP to the release position RP, as shown in FIGS. 5 and 9. Then the spring 66 of the moving means 65 is freed from retention by the retaining member 68 and pushes the piercing pin 61 to the piercing position so the pin 61 pierces and unseal the lid 38, as shown in FIGS. 9 and 10, so that an inflation gas G contained in the main body 37 of the gas generator 35 flows into the housing 43 of the gas discharge portion 42 from the lid 38, then flows into the gas-inlet portion 25 of the airbag 20 via the outlet port 47 of the housing 43, thus inflates the airbag 20. In a region from the lid 38 of the gas generator 35 to the gas-inlet portion 25 of the airbag 20 (i.e. in the gas channel 46), the piercing pin 61, the spring 66 and the leading end 68*a* portion of the retaining member 68 are covered by the housing 43 (or tubular portion 44) of the gas discharge portion 42, whereas the motor 72 (i.e. drive source 71) and the connecting member 78 of the sliding mechanism 70 that is configured to retract the retaining member 68 are disposed in the region partitioned from the gas channel 46 disposed in the housing 43 by the circumferential wall 44*a* of the tubular portion 44. That is, the drive source 71 and the connecting member 78 of the sliding mechanism 70 are not disposed in the gas channel 46 of the inflation gas G in the gas generator 35. Accordingly, if the means for moving the piercing pin 61 makes use of pyrotechnic material such as a charge as the drive source, this configuration will prevent a flame generated by burning of the pyrotechnic material from entering into the airbag 20. Actually, since the illustrated embodiment adopts the motor 72 which is operable reversibly as the drive source 71, there will be no fear that a flame will enter into the airbag 20 at operation of the airbag device 10.

Therefore, the configuration of the first embodiment will eliminate a fear of damage of the airbag by heat, in an airbag device in which a gas generator to feed the airbag with an inflation gas is configured to discharge the inflation gas with the use of a piercing pin.

In the airbag device 10 in accordance with the first embodiment, the drive source 71 of the sliding mechanism 70 is composed of the motor 72 as the actuator that is operable reversibly and configured to be driven by an actuating signal. The base portion 78*b* of the connecting member 78 is wound around and connected to the driving portion (drive shaft 72*a*) of the motor 72.

With this configuration, not pyrotechnics, but the reversibly-operable actuator (i.e. motor 72) moves the connecting member 78 to retract the retaining member 68. Further, the actuator (i.e. motor 72) is able to restore the driving portion (i.e. driving shaft 72*a*) to a state before operation. Accordingly, this configuration will render the airbag 20, the piercing pin 61, the retaining member 68 and the connecting member 78 of the gas discharge portion 42 reusable by replacing the main body 37 of the gas generator 35.

The actuator 72 in the first embodiment is configured to operate under control of the control device 80 that takes inputs from the sensor 81 that sensed an operation timing (a fall of the wearer 1, in the illustrated embodiment).

With this configuration, the airbag device 10 in accordance with the first embodiment will operate adequately based on a determination of the control device that sensed the operation timing (fall of the wearer 1).

Figure 11:
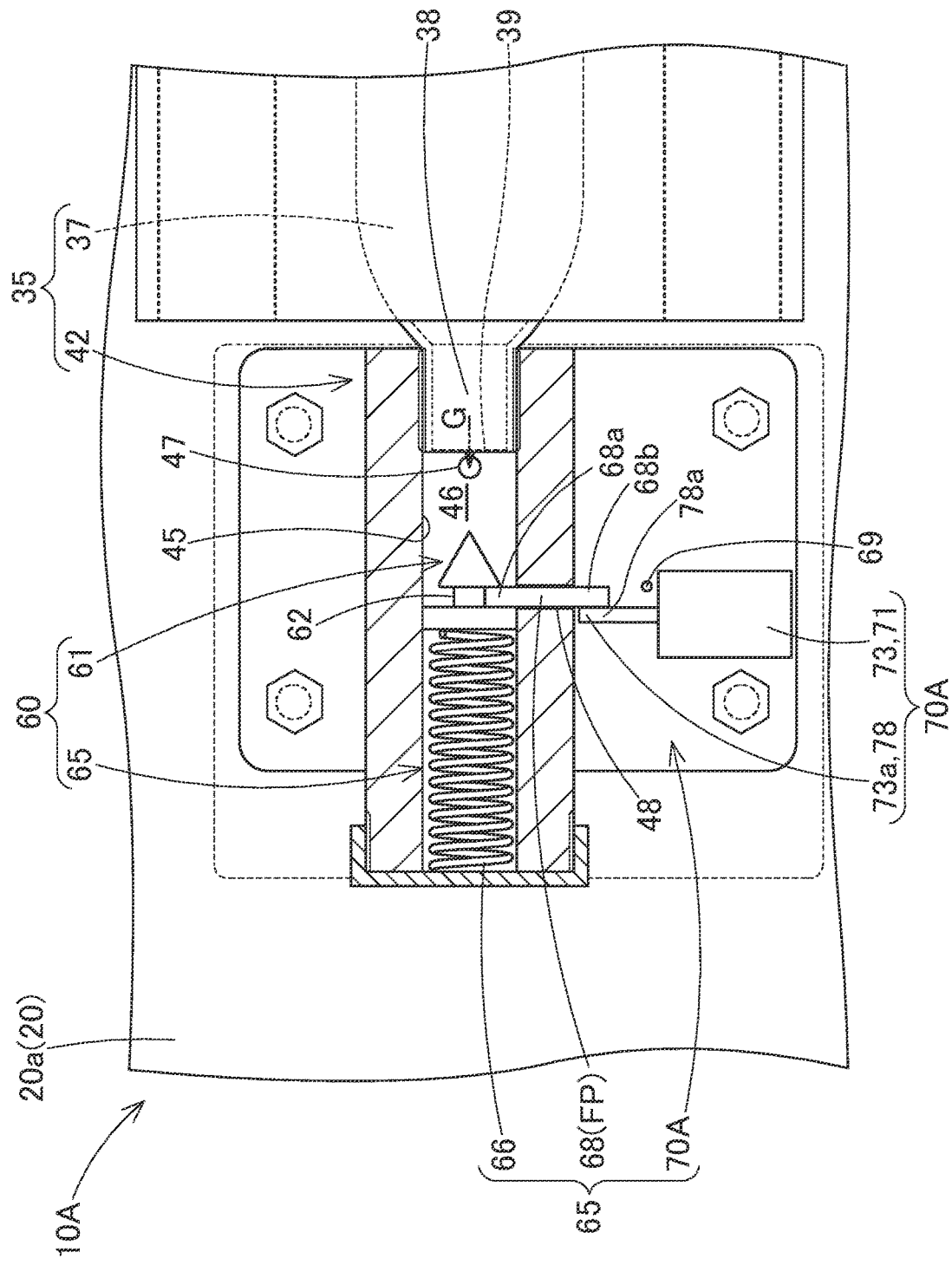
FIG. 11 is a schematic sectional view illustrating an airbag device in accordance with the second embodiment before operation.
Figure 12:
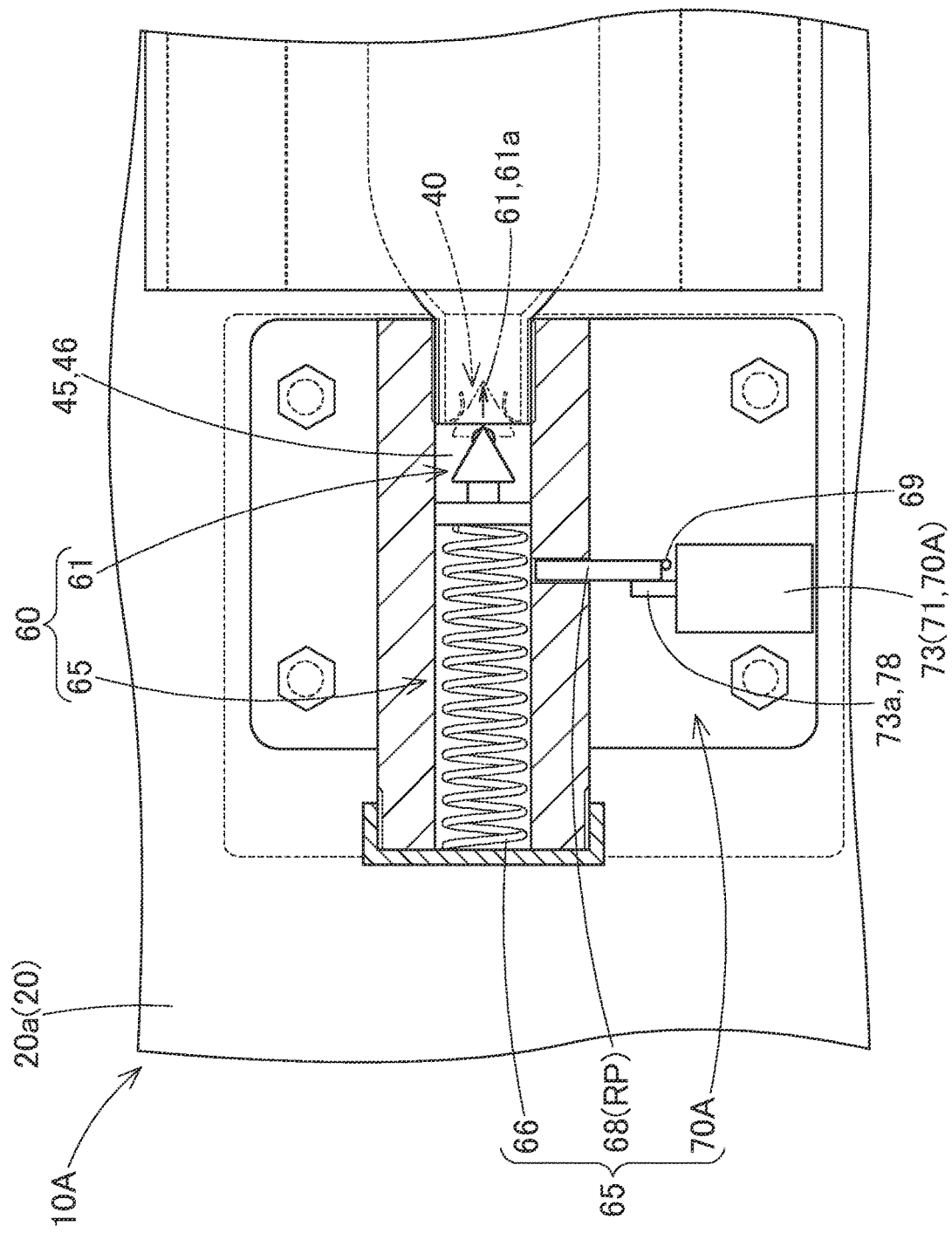
FIG. 12 is a schematic sectional view illustrating the airbag device in accordance with the second embodiment at operation.

In the sliding mechanism 70 in the first embodiment, the actuator 72 as the drive source is composed of the motor 72 that is configured to rotate the driving shaft 72*a* to rewind the connecting member 78 to retract the retaining member 68. Alternatively, the sliding mechanism may be configured like the one 70A in accordance with the second embodiment depicted in FIGS. 11 and 12. In the sliding mechanism 70A of the second embodiment, the actuator or drive source is composed of a solenoid 73 that is able to extend and retract its plunger 73*a*. The plunger 73*a* concurrently acts as the connecting member 78 that is connected to the retaining member 68. When actuated, the solenoid 73 operates to retract the plunger 73*a* as the connecting member 78 to move the retaining member 68 from the retaining position FP to the release position RP.

In the airbag device 10A in accordance with the second embodiment, when the sensor 81 detects a fall of the wearer 1, the not-shown operation control device 80 will actuate the solenoid 73 as the actuator to retract the plunger 73*a* as the connecting member 78, then the connecting member 78 will pull the retaining member 68 to move from the retaining position FP to the release position RP, so that the spring 66 will be freed from retention by the retaining member 68, exert a restoring force and push the piercing pin 61. The piercing pin 61 will then form an opening 40 in and unseals the sealing plate 39 of the lid 38, so that the inflation gas G contained in the main body 37 will flow through the gas channel 46 in the housing 43 and flow into the airbag 20 to inflate the airbag 20.

The configuration of the second embodiment will provide the same working effects as those of the first embodiment.

The second embodiment differs from the first embodiment only in that the drive source 71 is composed of the solenoid 73 that is configured to operate the plunger 73*a* which serves as the connecting member 78. The main body 37 and the gas discharge portion 42 of the gas generator 35, the airbag 20 and the holding body 11 of the second embodiment have same configurations as those of the first embodiment.

Figure 13:
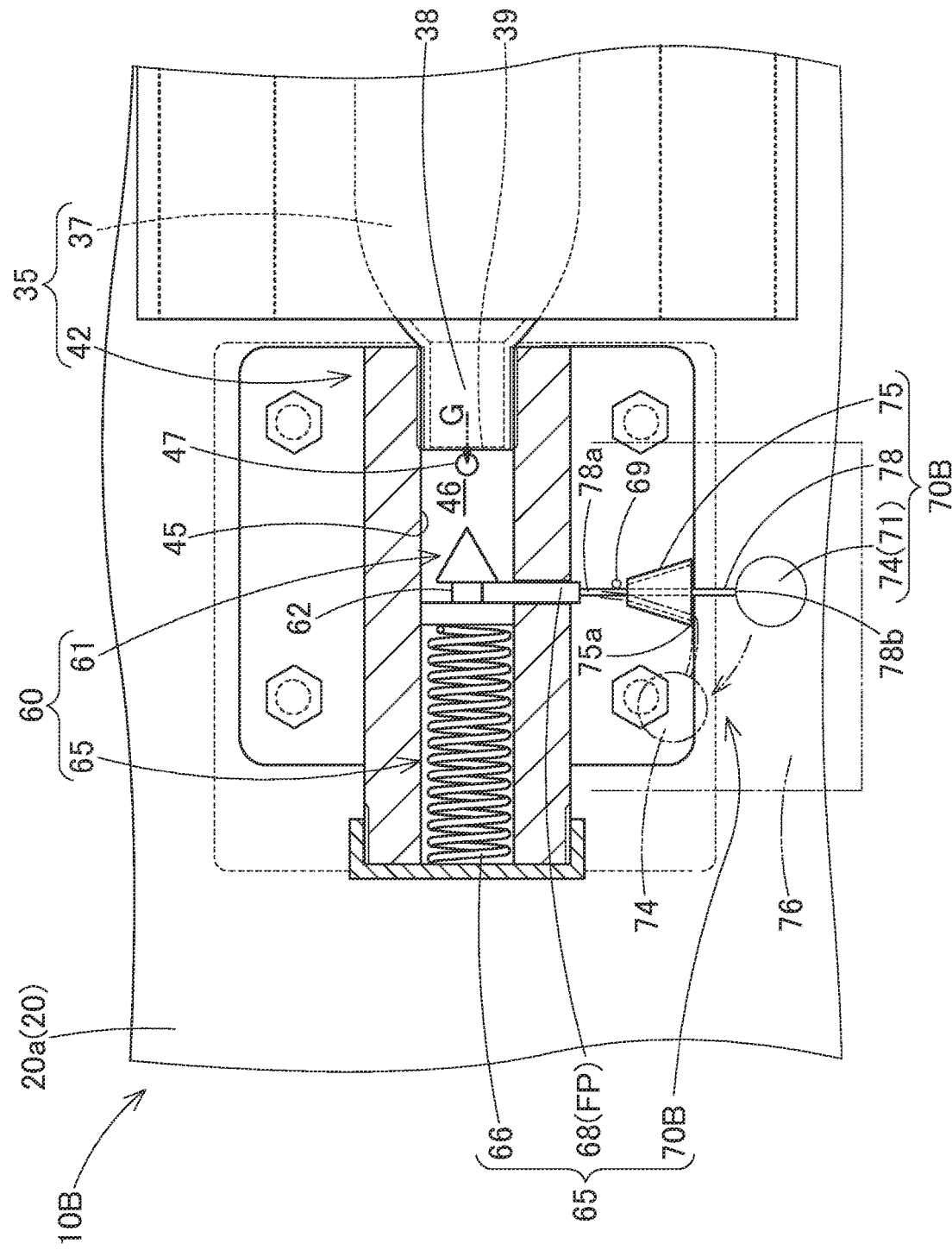
FIG. 13 is a schematic sectional view illustrating an airbag device in accordance with the third embodiment before operation.

Further alternatively, the sliding mechanism may be configured like the one 70B of an airbag device 10B in accordance with the third embodiment depicted in FIGS. 13 and 14. In the sliding mechanism 70B, the drive source 71 is composed of a kinetic energy of a weight 74 that is connected to the connecting member 78.

In the third embodiment, the connecting member 78 connected to the retaining member 68 is connected to the weight 74 at the base portion 78*b*. The connecting portion 78 is composed of a wire. When the wearer 1 falls, a strong inertial force will act on the airbag device 10 along with the sudden stop of motion, and cause the weight 74 to oscillate greatly. Then the weight 74 will operate in such a manner as to pull the connecting member 78 so the connecting member 78 retracts the retaining member 68 from the retaining position FP to the release position RP.

In the third embodiment, the weight 74 is covered by a cover 76 so as not to be engaged with surrounding members inside the outer cover 14, thus allowed to oscillate freely inside the cover 76. The connecting member 78 is passed through a guide 75 which is formed into a tapered tube, then connected to the weight 74. With this configuration, if the weight 74 oscillates greatly, the base portion 78*b* of the connecting member 78 will also oscillate along with the oscillation of the weight 74, hit the edge 75a of the guide 75, so that the weight 74 will rebound upward, limited in radius of rotation, thus pull the connecting member 78 forcefully. This way the connecting member 78 will pull the retaining member 68 to shift the retaining member 68 from the retaining position FP to the release position RP.

The spring 66 that has been freed from retention by the retaining member 68 will push the piercing pin 60 so the pin 60 will pierce and form an opening 40 in the sealing plate 39 of the lid 38, then the inflation gas G contained in the main body 37 will flow through the gas channel 46 in the housing 43 and flow into the airbag 20 to inflate the airbag 20.

The configuration of the third embodiment will provide the same working effects as those of the first embodiment.

The third embodiment makes use of the kinetic energy (i.e. inertial force) of the weight 74 as the drive source 71. Therefore, the airbag device 10B in accordance with the third embodiment is able to deploy the airbag 20 without utilizing a sensor 81 and a control device 80 for operating a drive source 71, and an actuator 72, 73 configured to be operated by the control device 80.

The third embodiment differs from the first embodiment only in that the drive source 71 makes use of the weight 74 and does not make use of a control device 80 provided with a sensor 81. The main body 37 and the gas discharge portion 42 of the gas generator 35, the airbag 20 and the holding body 11 of the third embodiment have same configurations as those of the first and second embodiments.

Each of the airbag devices 10, 10A and 10B of the foregoing embodiments includes the holding body 11 that holds the airbag 20 and the gas generator 35, and is configured to be wearable, so that the airbag device serves as a wearable airbag device.

Even with this configuration, since the gas generator 35 of the airbag device 10, 10A, 10B is configured to generate an inflation gas G without making use of a charge, there will be no fear that a flame would enter the airbag and damage the airbag and the wearer at airbag deployment.

In the foregoing embodiments, the holding body 11 that holds the airbag 20 and the gas generator 35 is formed into a belt. Alternatively, the holding body may be formed into a vest or a jacket as long as the airbag 20 is designed to cover a vicinity of each of trochanters 3 (3L, 3R) of left and right femurs of the wearer 1 by the protecting inflatable portion 23L/23R.

In each of the foregoing embodiments, the gas generator 35 is attached to the front panel 20a of the airbag 20 which is to face away from the body of the wearer 1 when worn. However, the gas generator 35 may also be attached to the back panel 20b of the airbag 20 which is to face the body of the wearer 1 when worn.

Although the invention is applied to a wearable airbag device in the foregoing embodiments, the application of the invention should not be limited thereby. The invention may also be applied to an airbag device for a drone that is adapted to be mounted on a drone for protecting people and/or buildings present at destination at descent of the drone.

The exemplary embodiment in the present disclosure relates to an airbag device including:
  an airbag that is configured to be inflated with an inflation gas, the airbag including a gas-inlet portion;
  a gas generator that includes a main body which contains the inflation gas and sealed with an unsealable lid, and a gas discharge portion that includes a housing provided with an outlet port which is in gas communication with the gas-inlet portion of the airbag and configured to allow outflow of the inflation gas to the gas-inlet portion of the airbag when the lid is unsealed; and
  a means for unsealing the lid of the main body of the gas generator, the means for unsealing being disposed in the gas discharge portion of the gas generator, the means for unsealing including a piercing pin that is configured to pierce and unseal the lid, and a means for moving the piercing pin to a position to pierce the lid,
  wherein the means for moving includes:
  a spring that is configured to push and move the piercing pin from a wait position to the position to pierce;
  a retaining member that retains a leading end of the spring so the spring holds the piercing pin at the wait position; and
  a sliding mechanism that is configured to move the retaining member from a retaining position at which the retaining member retains the leading end of the spring to a release position at which the retaining member releases the leading end of the spring;
  wherein the sliding mechanism includes:
  a drive source that is configured to exert a driving force; and
  a connecting member that is connected to the retaining member and the drive source and configured to move the retaining member to the release position by the driving force exerted by the drive source;
  wherein the piercing pin, the spring, the lid of the main body of the gas generator and a portion of the retaining member that retains the leading end of the spring are housed in the housing of the gas discharge portion of the gas generator so that a gas channel from the lid to the outlet port is formed inside the housing; and
  wherein the drive source and the connecting member of the sliding mechanism are located in a region partitioned from the gas channel by the housing, in the gas discharge portion.

At operation of the airbag device in accordance with the exemplary embodiment, when the driving force of the drive source acts on the connecting member, the connecting member shifts the retaining member from the retaining position to the release position. Then the spring of the means for moving is freed from retention by the retaining member and pushes the piercing pin to the piercing position so the pin pierces and unseal the lid, so that an inflation gas contained in the main body of the gas generator flows into the housing of the gas discharge portion from the lid, then flows into the gas-inlet portion of the airbag via the outlet port of the housing, thus inflates the airbag. In a region from the lid of the gas generator to the gas-inlet portion of the airbag, the piercing pin, the spring and the portion of the retaining member retaining the spring are housed in the housing of the gas discharge portion, whereas the drive source and the connecting member of the sliding mechanism to shift the retaining member are disposed in the region partitioned from the gas channel disposed inside the housing by the housing. That is, the drive source and the connecting member of the sliding mechanism are not disposed in the gas channel of the inflation gas in the gas generator. Accordingly, if the means for moving the piercing pin makes use of pyrotechnic material such as charge as the drive source, this configuration will prevent a flame generated by burning of the pyrotechnic material from entering into the airbag. Furthermore, if the means for moving adopts, as the drive source, by way of example, an actuator such as a motor and a solenoid which are operable reversibly, or gravity, there will be no fear that a flame would enter into the airbag at operation of the airbag device.

Therefore, the configuration of the exemplary embodiment will eliminate a fear of damage of the airbag by heat, in an airbag device in which a gas generator to feed the airbag with an inflation gas is configured to discharge the inflation gas with the use of a piercing pin.

In one or more embodiments, the drive source of the sliding mechanism may be composed of an actuator that is operable reversibly and configured to be driven by an actuating signal.

With this configuration, not pyrotechnics, but the reversibly-operable actuator such as a motor and a solenoid moves the connecting member to shift the retaining member. Further, the actuator can be restored to a state before operation. Accordingly, this configuration will render the airbag, the piercing pin, the retaining member and the connecting member reusable by replacing the main body of the gas generator.

In one or more embodiments, the actuator may be configured to operate under control of a control device that takes inputs from a sensor that sensed an operation timing.

With this configuration, the airbag device will operate adequately based on a determination of the control device that sensed the operation timing.

In one or more embodiments, the airbag device may include a weight that is connected to the connecting member and configured such that the drive source is composed of a kinetic energy of the weight as the weight swings.

With this configuration, when a strong inertial force caused by sudden deceleration acts on the airbag device, the force will cause the weight to oscillate greatly. Then the weight will operate in such a manner as to make the connecting member shift the retaining member to the release position. The spring that has been freed from retention by the retaining member will push the piercing pin so the pin will pierce and unseal the lid, then the inflation gas will flow out of the main body and flow into the airbag. That is, the above configuration is able to deploy the airbag without utilizing a sensor for operating the drive source and an actuator configured to be electrically operated by a signal value of the sensor.

In one or more embodiments, the airbag device may further include a holding body that holds the airbag and the gas generator and is configured to be wearable so that the airbag device serves as a wearable airbag device.

Even with this configuration, since the gas generator of the airbag device is configured to generate an inflation gas without making use of a charge, there will be no fear that a flame would enter the airbag and damage the airbag and the wearer at airbag deployment.

What is claimed is:

1. An airbag device comprising:
an airbag that is configured to be inflated with an inflation gas, the airbag including a gas-inlet portion;
a gas generator that includes a main body which contains the inflation gas and sealed with an unsealable lid, and a gas discharge portion that includes a housing provided with an outlet port which is in gas communication with the gas-inlet portion of the airbag and configured to allow outflow of the inflation gas to the gas-inlet portion of the airbag when the lid is unsealed; and
a means for unsealing the lid of the main body of the gas generator, the means for unsealing being disposed in the gas discharge portion of the gas generator, the means for unsealing including a piercing pin that is configured to pierce and unseal the lid, and a means for moving the piercing pin to a position to pierce the lid, wherein the means for moving includes:
a spring that is configured to push and move the piercing pin from a wait position to the position to pierce;
a retainer that retains a leading end of the spring so the spring holds the piercing pin at the wait position; and
a slider that is configured to move the retainer from a retaining position at which the retainer retains the leading end of the spring to a release position at which the retainer releases the leading end of the spring;
wherein the slider includes:
a driver that is configured to exert a driving force; and
a connector that is connected to the retainer and the driver and configured to move the retainer to the release position by the driving force exerted by the driver;
wherein the piercing pin, the spring, the lid of the main body of the gas generator and a portion of the retainer that retains the leading end of the spring are housed in the housing of the gas discharge portion of the gas generator so that a gas channel from the lid to the outlet port is formed inside the housing;
wherein the driver and the connector of the slider are located in a region partitioned from the gas channel by the housing, in the gas discharge portion; and
wherein the retainer is configured to abut against a stopper and to be regulated to a position by the stopper when the retainer is at the release position.

2. The airbag device of claim 1, wherein the driver is composed of an actuator that is operable reversibly and configured to be driven by an actuating signal.

3. The airbag device of claim 2, wherein the actuator is configured to operate under control of a control device that takes inputs from a sensor that senses operation timing.

4. The airbag device of claim 1, further including a weight that is connected to the connector, and wherein the driver is composed of a kinetic energy of the weight as the weight swings.

5. The airbag device of claim 1, further including a holding body that holds the airbag and the gas generator and is configured to be wearable so that the airbag device serves as a wearable airbag device.

* * * * *